United States Patent

Kuhne

[11] 3,721,488
[45] March 20, 1973

[54] FOCUSING ARRANGMENT FOR AFOCAL TELESCOPES

[75] Inventor: Christoph Kuhne, Heidenheim, Germany

[73] Assignee: Carl Zeiss-Stiftung d/b/a Carl Zeiss, Heidenheim (Brenz) Wuerttember, Germany

[22] Filed: May 4, 1971

[21] Appl. No.: 140,183

[30] Foreign Application Priority Data

May 29, 1970 Germany...................P 20 26 340.5

[52] U.S. Cl.....................350/46, 356/125, 356/153
[51] Int. Cl..................................................G02b 7/04
[58] Field of Search..........................350/46, 47, 212; 356/124–127, 153

[56] References Cited

UNITED STATES PATENTS 2,577,807   11/1951   Pryor.......................................356/153
3,542,478   11/1970   Dessus....................................356/153
3,574,467   4/1971    Paine......................................356/153

FOREIGN PATENTS OR APPLICATIONS 346,708    7/1960    Switzerland........................356/153

Primary Examiner—David H. Rubin
Attorney—Singer, Stern & Carlberg

[57] ABSTRACT

A focusing arrangement for afocal telescopes in which a small autocollimating telescope limited to the cross-section of the entering beam is to be focused in itself toward a plane reference mirror and in which a plane glass-air surface is used to cover the objective of the afocal telescope, whereby the reflection from the autocollimating telescope is utilized for recognizing the deviation from the correct state of focusing of the afocal telescope.

4 Claims, 5 Drawing Figures

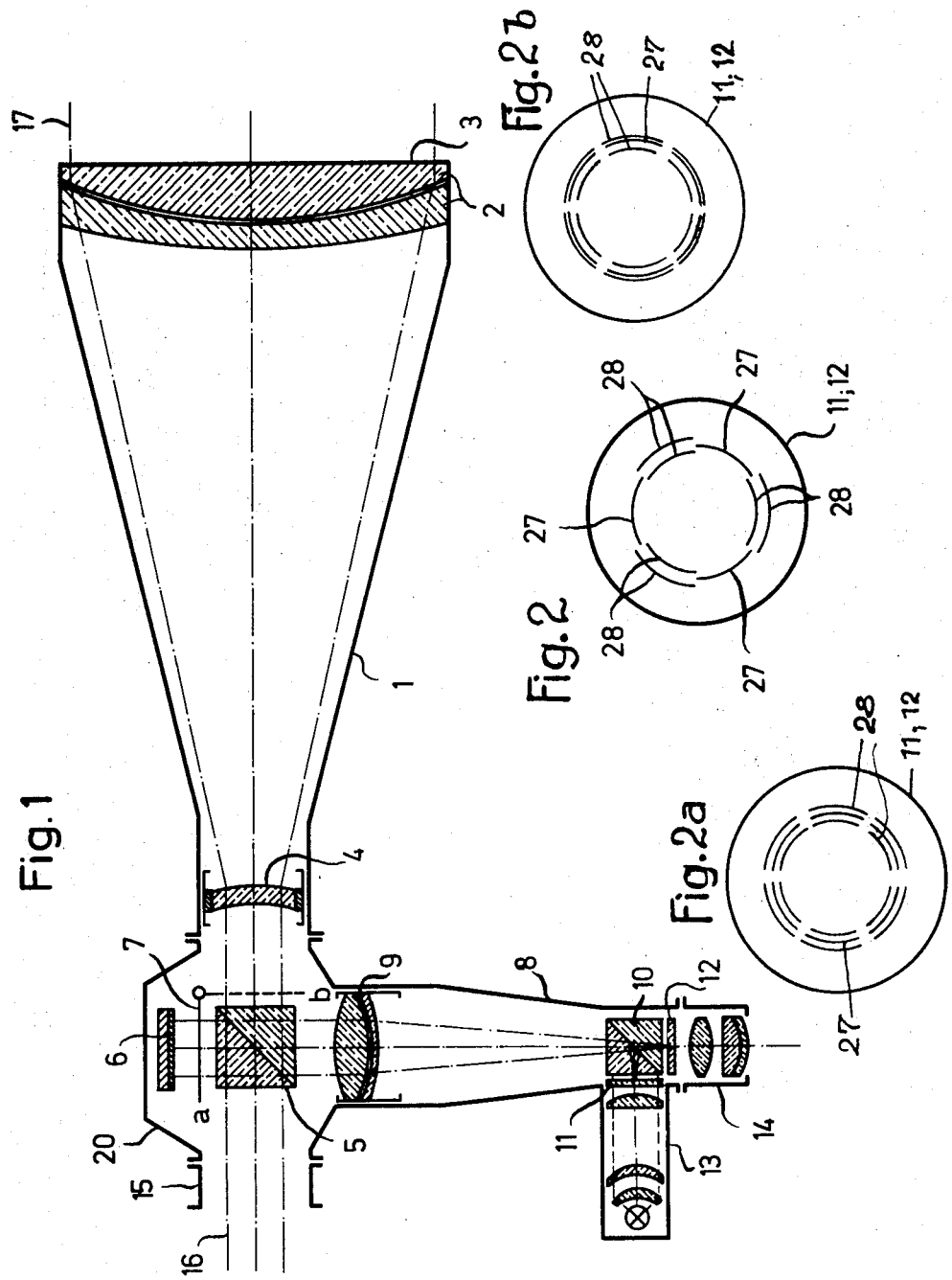

FOCUSING ARRANGMENT FOR AFOCAL TELESCOPES

The invention relates to a focusing arrangement for afocal telescopes.

When using lasers in technical illuminating systems and electro-optical measuring arrangements of any type afocal telescopes frequently succeed the laser, if the practically parallel light beam emitted by the laser is to be converted to a likewise parallel light beam of different diameter. The natural residual divergence of the laser beam which theoretically is due to refraction is reduced by the same factor as the parallel beam is increased.

Sometimes, great demands are made on the observance of the parallelism of the beam produced by the afocal telescope. This applies, in particular, in cases where the laser light is to be transferred across very large distances, for istance, in the case of electro-optical rangefinders or signal carriers for the transmission of communications. Any deviation from parallelism leads to an undesired loss in energy at the respective receiving station. Though it is possible to establish the correct focusing of the telescope by means of measuring the receiving energy and adjustment to the maximum thereof, it requires the existence of an information transfer between the telescope and the receiver which may involve a considerable display of apparatus.

A simple method and the auxiliary means of its application for the focusing of an afocal system shall be provided hereinafter, which can be utilized irrespective of the receiving station. Though the use of the arrangement for energy reasons is predominantly restricted to afocal laser telescopes, it may, however, also be extended to afocal optical systems of different purpose and object.

The auxiliary means comprise a plane reference mirror, a beam splitter, a stop adapted to be switched and an auxiliary telescope having an autocollimating system including an objective, two identical graticules, a beam splitter, an illuminating system and an eyepiece with eyesight adjustment. In an arrangement to be described hereinafter, these auxiliary means are used for the proper focusing of the auxiliary telescope in such a manner that the beam associated with one point of the one graticule outwardly of the auxiliary telescope is a parallel beam. According to the inventive concept the afocal telescope to be focused is designed so that the last optical element of this telescope is closed off outwardly by a plane glass-air surface. Now, if after execution of the proper focusing of the auxiliary telescope, the beam of the auxiliary telescope is passed through the afocal system, the last glass-air surface will reflect the beam and only then accurately back in itself, if the same (and therewith also the emergent beam) is a parallel beam. Any deviation from parallelism can be recognized in the eyepiece of the auxiliary telescope and be eliminated by focusing the afocal system.

The invention will now be described with reference to the accompanying drawings, in which FIG. 1 is a schematic arrangement of an afocal laser telescope incorporating the auxiliary means of the invention.

FIG. 2 is a detailed illustration of each of the two graticules used in this conjunction (11 and 12 of FIG. 1).

FIG. 2a illustrates the focused condition; and

FIG. 2b illustrates the non-focused condition of the objective.

Figure 3:
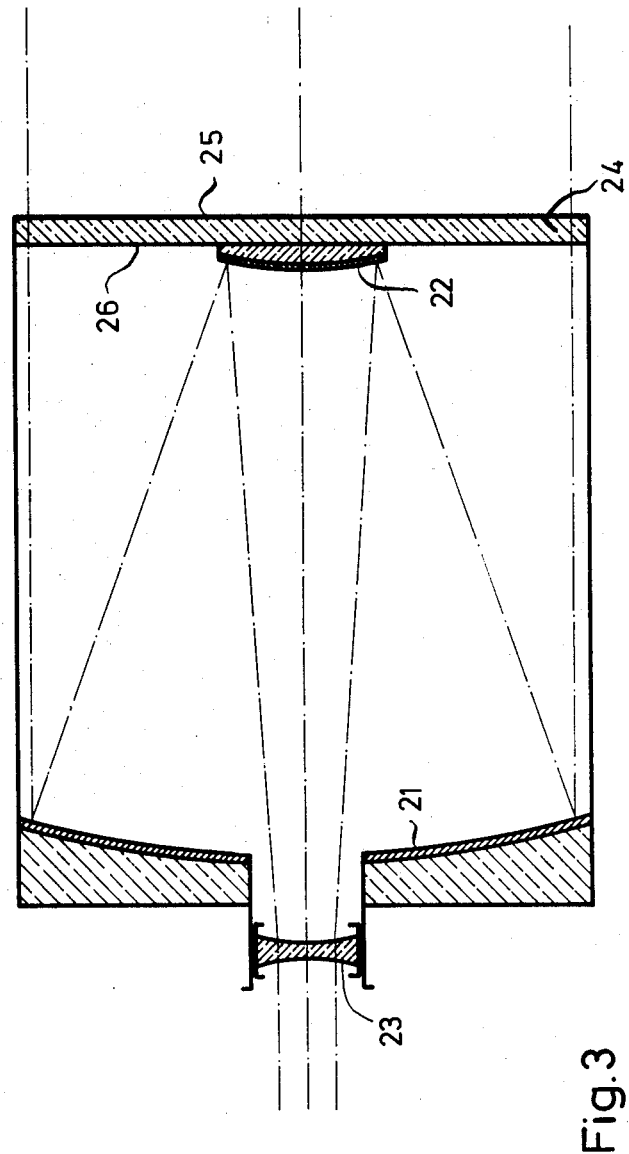
FIG. 3 is an afocal laser telescope designed as reflecting telescope in which the last plane glass-air surface is provided by a plane parallel plate.

In FIG. 1, reference numeral 1 designates the afocal telescope including, for instance, a two-lens positive 2 whose outer surface 3 is in accordance with the invention a plane surface. The negative 4 illustrated here as an unipotential lens is movable in a focusing slide along the optical axis. The sliding arrangements are not illustrated in detail. The auxiliary arrangements comprise a housing portion 20 containing a beam splitting prism 5, a plane reference mirror 6 and a stop 7. The prism 5 and the mirror 6 can be tilted by small amounts in two directions vertically to the optical axis. The stop 7 can alternatively be moved into the position a or b. Reference numeral 8 designates the auxiliary autocollimating telescope whose optical axis extends at right angles to the optical axis of the afocal telescope. It includes, for instance, a two-lens objective 9 which is movable along the optical axis for the purpose of focusing. It further includes a beam splitter 10 axially spaced from the objective 9 and two graticules 11 and 12. These graticules are completely alike, for instance, produced as by contact printing. A possible design of the line targets applied to the graticules is shown in FIG. 2. The graticule 11 is illuminated by an illuminating system 13, while the graticule 12 can be observed with an eyepiece 14 with eyesight adjustment. Reference numeral 15 indicates a flange connection on the housing portion for a laser whose light beam 16, shown by dash-dotted lines, enters into the auxiliary arrangements and leaves the laser telescope again as a beam 17.

Focusing of the laser telescope 1 must be preceded by the focusing of the auxiliary telescope 8. To this end, the stop 7 is moved into position b, shown in dash lines, and the graticule 11 illuminated by 13 is imaged toward the infinite through the beam splitter 10 by the objective 9. The beam impinges upon the mirror 6, is reflected by the same and imaged onto the graticule 12 by the objective 9. Possibly existing lateral displacements of the image of 11 to 12 are eliminated by tiltings of 6, until the image of 11 and the graticule 12 are concentric on each other. Observation is effected through the eyepiece 14 which is sharply focused with the aid of eyesight adjustment to the graticule 12.

If the objective 9 is not yet correctly focused, thus, if the beam between 9 and the mirror 6 is not yet a parallel beam, then the image of 11 will be greater or smaller than the line target 12. Then, the simple arcs 27 of the image of 11 will not be accurately disposed in the center of the double arcs 28 of 12. However, if 9 is then focused correctly, the line targets of 11 and 12 will form a triple ring system merging jointlessly. In this state, the auxiliary telescope is focused.

To focus the laser telescope the stop 7 is moved from the position b towards a. Now, the path of rays instead of extending towards the plane mirror 6 passes towards the front face 3 of the objective 2 and is reflected by the same in the same manner towards the graticule 12 as previously from 6. Lateral displacements of this image formation may again be eliminated by tiltings of the beam splitter 5. Now the negative 4 is shifted axially until the image of 11 jointlessly merges with the line target of 12. In this state the laser telescope is focused. If the laser is now switched on, the laser beam will leave the telescope as a parallel beam.

For the practical execution of the method it is advantageous to have all glass-air surfaces of the optical elements 2, 4, 5, 9 and 10, with the exception of the surface 3, provided with known anti-reflection coatings (T-coating). Then, the reflected intensity of the coated surfaces in the amount of approximately 0.5 percent is less by the factor 8 than that of the surface 3 in the amount of approximately 4 percent. Thereby, autocollimation images of undesired reflection are avoided. Moreover, it may be advantageous to attenuate the autocollimation path of rays through the mirror 6, for instance by providing that the reflecting surface of 6 is unmirrored. Then, the visual impression in both focusing steps is about equal.

FIG. 3 illustrates a modification of a laser telescope. The main mirror 21 and the secondary mirror 22 constitute a known Cassegrain-system which is almost afocal. A lens 23 of small negative refractive power, which is arranged for axial movement, is used as focusing element. Of course, it is also possible to design the Cassegrain-system 21 and 22 to be afocal from the outset and to accomplish the required focusing by movement of the secondary mirror. According to the invention, the telescope ends with a glass plate 24 whose outer plane surface 25 is used as a reflecting surface to observe the state of focusing. The other inner surface 26 of the plate 24, which is also plane, must necessarily be coated in this case in order to ensure unambiguity of the adjustment.

What I claim is:

1. A focusing arrangement for an afocal telescope, particularly for a laser telescope, in which said afocal telescope comprises an objective consisting of a fixedly mounted lens means and another lens means arranged in spaced axial alignment therewith, said other lens means being axially shiftable for focusing, the outer face of said fixedly mounted lens means facing away from said other shiftable lens means being a plane face, a housing connected with said afocal telescope and arranged adjacent the side of said other shiftable lens means facing away from said fixedly mounted lens means; and an auxiliary autocollimating telescope for assisting in the focusing of said afocal telescope, said auxiliary autocollimating telescope being arranged with its optical axis at right angles to the optical axis of said afocal telescope and having a focusing objective shiftable along the optical axis of said autocollimating telescope, a beam splitting prism arranged within said housing, an illuminating system, a first graticule through which light from said illuminating system passes toward and through said focusing objective and through said beam splitting prism for imaging said first graticule toward the infinite, a reflecting mirror in said housing for reflecting the light passing through said beam splitting prism back through said focusing objective onto a second graticule which is of the same size and design as said first graticule, and an adjustable stop within said housing selectively movable to a first position between said beam splitting prism and said reflecting mirror and to a second position between said beam splitting prism and said other lens means of said afocal telescope, whereby when said stop is in said second position the light passing through said beam splitter is reflected by said mirror back through said focusing objective and forms an image of said first graticule on said second graticule, said reflected image corresponding in its magnitude exactly to said second graticule when said focusing objective has been adjusted to its focus position, and whereby when said stop is in said first position said outer face of said fixedly mounted lens means will reflect the light passing through said focusing objective and beam splitting prism back to said second graticule to form thereon an image of said first graticule whose magnitude will be exactly that of said second graticule when said other lens means has been adjusted to its focus position.

2. A focusing arrangement according to claim 1, in which said fixedly mounted lens means of said afocal telescope consists of two lenses, the outermost one of these two lenses being planoconvex with its plane face being the last air-boundary surface, all the air-boundry lens surfaces of the lens means of said afocal telescope, with the exception of said plane face, having an antireflection coating.

3. A focusing arrangement according to claim 1, in which said fixedly mounted lens means of said afocal telescope is provided on the exit side of said afocal telescope with a plane-parallel glass plate, all of the air-boundary lens surfaces of said lens means of said afocal telescope, with the exception of said plane-parallel glass plate, having an anti-reflection coating.

4. A focusing arrangement according to claim 1, including a beam splitter arranged in spaced axial alignment from said focusing objective of said autocollimating telescope, an eyepiece arranged adjacent the side of said beam splitter directed away from said focusing objective, said first graticule being disposed between said illuminating system and said beam splitter, and said second graticule being disposed between said beam splitter and said eyepiece.

* * * * *